(12) United States Patent
Nantin et al.

(10) Patent No.: US 8,341,925 B2
(45) Date of Patent: Jan. 1, 2013

(54) METHOD OF PACKING A FOOD PRODUCT WITH EXTENDED SHELF-LIFE

(75) Inventors: Hans Nantin, Malmö (SE); Jan Lagerstedt, Malmö (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 339 days.

(21) Appl. No.: 12/523,022

(22) PCT Filed: Oct. 29, 2007

(86) PCT No.: PCT/SE2007/000949
§ 371 (c)(1),
(2), (4) Date: Jul. 13, 2009

(87) PCT Pub. No.: WO2008/094083
PCT Pub. Date: Aug. 7, 2008

(65) Prior Publication Data
US 2010/0000183 A1     Jan. 7, 2010

(30) Foreign Application Priority Data
Feb. 1, 2007 (SE) ........................ 0700252

(51) Int. Cl.
*B65B 63/08* (2006.01)
(52) U.S. Cl. .................. 53/440; 53/127; 53/477; 53/514
(58) Field of Classification Search .............. 53/111 R, 53/425, 426, 432, 440, 477, 510, 514, 518, 53/127
See application file for complete search history.

(56) References Cited

U.S. PATENT DOCUMENTS

| | | | |
|---|---|---|---|
| 2,433,071 A | 12/1947 | Stevenson | |
| 2,897,851 A * | 8/1959 | Meldrum | 141/70 |
| 3,406,080 A * | 10/1968 | Gibble | 426/393 |
| 3,477,192 A | 11/1969 | Brown et al. | |
| 4,827,988 A * | 5/1989 | Gotz et al. | 141/167 |
| 5,804,237 A | 9/1998 | Diamond et al. | |
| 6,557,319 B1 * | 5/2003 | Nolfi, Jr. | 53/127 |
| 6,761,920 B1 * | 7/2004 | Kaplan | 426/399 |

(Continued)

FOREIGN PATENT DOCUMENTS

| | | |
|---|---|---|
| EP | 0 008 886 A1 | 3/1980 |
| EP | 0 628 259 A1 | 12/1994 |
| WO | WO 93/16610 | 9/1993 |
| WO | WO 97/14614 A1 | 4/1997 |
| WO | WO 03/035503 A1 | 5/2003 |

OTHER PUBLICATIONS

PCT/ISA/210 for PCT/SE2007/000949 completed Apr. 25, 2008.

*Primary Examiner* — Thanh Truong
(74) *Attorney, Agent, or Firm* — Buchanan Ingersoll & Rooney PC

(57) ABSTRACT

A method of packing and, for purposes of extending its shelf-life, heat treating a food product in a packaging container of paper or paperboard. The packaging container is first filled wholly or at least partly with foam containing a non-oxidizing gas, such as nitrogen, whereafter the wholly or partly filled packaging container is filled with the pertinent food product. After this filling, the packaging container is, where necessary, filled with additional foam to ensure the headspace above the product level in the packaging container is entirely filled with foam when the packaging container is closed and sealed by thermosealing. The closed packaging container filled with product and foam is thereafter subjected to the heat treatment for purposes of extending its shelf-life at a treatment temperature of at least 115° C.

13 Claims, 3 Drawing Sheets

U.S. PATENT DOCUMENTS

Figure 2:
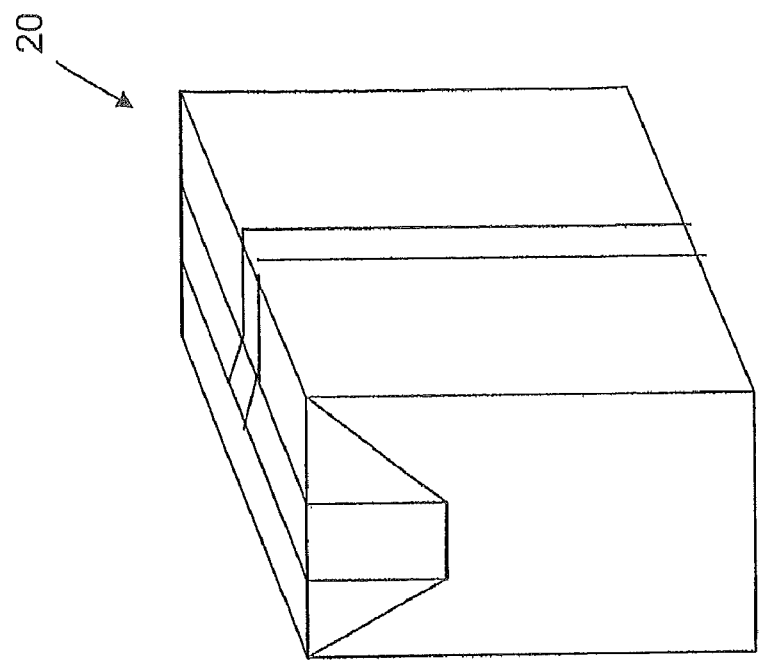

| | | | |
|---|---|---|---|
| 2003/0110736 A1* | 6/2003 | Boyd | 53/440 |
| 2005/0008800 A1 | 1/2005 | Andersson et al. | |
| 2009/0022863 A1* | 1/2009 | Lagerstedt et al. | 426/393 |
| 2010/0034938 A1* | 2/2010 | Stjernberg et al. | 426/398 |

* cited by examiner

METHOD OF PACKING A FOOD PRODUCT WITH EXTENDED SHELF-LIFE

TECHNICAL FIELD

The present invention relates to a method of packing and heat treating a food product with a view to extending its shelf-life, in a packaging container of paper or paperboard, the method comprising the steps of, prior to and/or in immediate association with filling of the food product, also filling the packaging container with foam containing a non-oxidising gas and, after such filling of the packaging container, to close it by thermosealing and expose the packed food product to a heat treatment extending its shelf-life.

BACKGROUND ART

Packaging containers of paper or paperboard which are intended to be filled with a food product which, with a view to extending its shelf-life, is to be subjected to a thermal treatment in the closed packaging container are generally filled only partly with the relevant product in order to permit a pressure-equalising expansion of the product during the heat treatment. Such an expansion possibility is particularly important in those cases when the food product consists wholly of or at least partly includes a liquid fraction which may readily be vaporized and thereby rapidly raise the vapour or steam pressure inside the packaging container to a level where the packaging container may be ruptured in its sealing joints, or even explode. A further reason for only partly filling the packaging container is that the free space above the level of the product can be efficiently utilised for accommodating such volume variations in the product flow as readily occur in the event of defects in a filling machine.

An unfilled space (so-called headspace) above the level of the product in a packaging container filled with a food product may, however, be associated with serious risks for the packed product, since ambient air in contact with the product flow before and during the filling operation proper may readily be entrained by and accompany the product flow into the packaging container and there accumulate and be entrapped in this space. Contact between such an entrapped volume of air and a packed food product inevitably leads to a harmful oxidative action on the product with the result that the product, by oxidation with the oxygen gas of the air, can be changed or deteriorate in both flavour and aroma as well as in appearance, and thereby become unattractive and even unfit for consumption. Such an oxidative process of destruction takes place over time and is different for different types of food products. For particularly oxygen gas-sensitive products, such as potatoes, asparagus, tubers, maize, fruits, meat and pet food, such a degradation process takes place very rapidly, while other less oxygen gas-sensitive products can, on the other hand, survive for a longer time without any appreciable negative effect.

Regardless of whether the food product which is to be packed and, by means of a subsequent heat treatment, be given extended shelf-life in the packaging container is of the one or other type, it is desirable to carry out the filling operation under such conditions that the entrapped volume of air in the packaging container will be as slight as possible and most preferably totally eliminated.

According to one prior art method, the product filling is carried out under the supply of a non-oxidising gas, such as, for example, nitrogen which, via one or more nozzles, is injected into the packaging container before and/or during the entire product filling operation in order to drive out air from the packaging container and fill the headspace above the level of the product with this gas. One example of such a prior art method is described in U.S. Pat. No. 3,477,192. A filling, during simultaneous supply of non-oxidising gas, requires immediate closure of the packaging container after filling in order to prevent the renewed entry of air into the packaging container. In practice however, product filling most generally takes place at a different site than subsequent closure of the packaging container filled with product, which thus implies that the filled, and as yet open packaging container, must first be conveyed a certain distance with the filled product in contact with the ambient air before the packaging container is closed. Even if the time for such a transport between filling and closure can be made very short, there is nevertheless always a risk that at least a part of the injected non-oxidising gas will have time to be forced out and replaced by air which has time to flow into the packaging container during this brief transport. Such inflowing air will hence be enclosed in and accompany the packaging container in direct contact with the product during the further storage of the product in the unopened packaging container.

According to a prior art method which is described in EP 0008886 A1, the risk of accompanying air in a closed packaging container may effectively be prevented or at least considerably reduced if the packaging container, before and/or in association with the product filling operation, is filled with a foam containing a non-oxidising gas, e.g. nitrogen. According to EP 0008886 A1, the open packaging container may thus first be filled the gas-containing foam in order to force out air present within the packaging container, and thereafter be filled with product to the desired level. After this filling, the headspace above the level of the product is more or less completely filled with foam which remains inside, and thus accompanies the packaging container after closure. The thus foam- and product-filled packaging container may thereafter be subjected to a heat treatment with a view to extending its shelf-life (pasteurization), i.e. a heat treatment during which the product is briefly heated to and held at a temperature of at most approx. 100° C., normally 72-78° C. According to EP 0008886 A1, it is also possible first to fill the open packaging container with the pertinent product to the desired level and thereafter, or in immediate association with this product filling, fill the remaining headspace above the product level with the gas-containing foam for forcing out any residual air. The thus foam- and product-filled packaging container is thereafter closed and sealed and can, as above, be subjected to a pasteurization for extending its shelf-life.

Examples of products which may be packed and heat treated in the method according to EP 0008886 A1 are liquids such as fermented beverages such as beer and non-carbonated drinks such as still drinks. However, EP 0008886 A1 is silent as to whether foods of a solid or semi-solid nature, such as for example potatoes, asparagus, tubers, maize, fruit, vegetables, meat and pet food can be used in the prior art method. Nor is it apparent from EP 0008886 A1 whether such solid or semi-solid foods can be packed and heat treated in combination with liquids, such as sauces, cooking juice, stock etc.

One drawback inherent in the prior art method according to EP 0008886 A1 is, however, that the foam entrapped in the product filling has a tendency to remain in and accompany the packaging container more or less intact, even after the subsequent heat treatment (the pasteurization) and the further storage of the product until it is time to open the packaging container. The remaining foam which is exposed on opening of the packaging container may thus give the packed product an excessively frothy appearance which can be associated with a deterioration in product quality caused by defective storage of the product during its storage time in the packaging container. The problem inherent in excessive froth or foam in the opened packaging container will naturally be more or less manifest in those cases where it is not at all expected that the packed product should froth, or even be remotely associated with froth, such as, for example, non-carbonated still drinks.

Hence, there is still a need to be able to pack and heat treat a food product with a view to extending its shelf-life in packaging containers of paper or paperboard without the risk of entrapping air or oxygen in the packaging container during the product filling and without the risk of consequential negative effects on the appearance of the filled product which is exposed on opening of the packaging container. In particular, there is still a need in the art to be able to pack a food of solid or semi-solid nature together with liquid foods, such as, for example, sauces, cooking juice, stock etc. without the risk of such harmful enclosure of air or oxygen and without the risk of such negative effects on the product which has been packed and heat treated for purposes of extending its shelf-life.

OBJECTS OF THE INVENTION

One object of the present invention is therefore to obviate the above-discussed drawbacks and shortcomings in the prior art technology.

A further object of the present invention is to realise a method by means of which an oxygen gas-sensitive food product may be packed and heat treated with a view to extending its shelf-life, in a packaging container of paper or paperboard, without the risk that air or oxygen is entrapped in and accompanies the packaging container in contact with the packed product.

Yet a further object of the present invention is to realise a method of the type described by way of introduction by means of which both solid and semi-solid fruit products may be packed together with a liquid food product and be heat treated in a packaging container of paper or paperboard, without the risk that air or oxygen is entrapped in the packaging container and without the risk that the gas-containing foam accompanies the packaging container intact throughout the entire storage life of the product.

These and other objects and advantages will be attained according to the present invention by means of the method which has the characterising features as set forth in appended Claim 1.

Expedient and practical embodiments of the method according to the present invention have the characterising features as set forth in the appended subclaims.

BRIEF SUMMARY OF THE INVENTION

According to the present invention, there will thus be realised a method of packing and, for purposes of extending its shelf-life, heat treating a food product in a packaging container of paper or paperboard, the method comprising the steps of, before and/or in connection with filling of the food product, also filling the packaging container with foam containing a non-oxidising gas and, after this filling, closing the packaging container by thermosealing and subjecting the packed food product to a heat treatment extending its shelf-life in the closed packaging container. The method is characterised in that the heat treatment is carried out at a treatment temperature of at least 115° C.

According to the present invention, it has surprisingly proved that residual foam in the packaging container after closure and sealing of the packaging container can effectively be caused to collapse and thus visually disappear if the heat treatment is carried out at a treatment temperature of at least approx. 115° C., i.e. a temperature which lies considerably above the temperature (at most approx. 100° C., most generally approx. 72-78° C.) at which a heat treatment by pasteurization is normally carried out.

A heat treatment which is carried out at a treatment temperature of at least approx. 115° C. also enjoys the advantage in comparison with a conventional pasteurization at at most approx. 100° C. is that it is sufficiently extensive and powerful to reliably exterminate not only harmful bacteria, so-called pathogens, but also more heat resistant microorganisms, such as spores. Such an extensive and effective heat treatment also entails that the packed food product is given a considerably longer and more reliable shelf-life than a milder heat treatment at lower temperature and thereby a longer time for the entrapped foam to collapse and disappear during the viable shelf-life of the packed product in the unopened packaging container.

According to one preferred embodiment, the shelf-life-extending heat treatment of the packed food product is carried out in a retort at a treatment temperature of approx. 120-140° C. in a per se known manner using already available treatment equipment. A heat treatment in a retort is normally carried out according to a batchwise method and can be put into effect with simultaneous agitation of the packed food product in order to hasten the thermal transfer to the product and thereby minimise the requisite treatment time for each batch being treated.

In such cases where the food product which is to be packed and heat treated using the method according to the present invention consists of or includes resiliently formable slices or chunks of fruit or vegetables, such as, for example, slices or chunks of pineapple, apple, peach etc., it is appropriate first to fill the packaging container with the gas-containing foam and thereafter with such resiliently formable fruit and vegetable chunks. The employment of this filling sequence effectively eliminates the risk that air unintentionally, but unavoidably may be entrapped in cavities or air pockets formed between the inner walls of the packaging container, in particular in corner areas, and fruit and vegetable chunks which, through their resilience, can sealingly entrap such air-filled cavities and pockets.

In other cases where the food product which is to be packed and heat treated in the method according to the present invention consists of or includes solid or but slightly resiliently formable particles or chunks of meat, fish, fruit or vegetables, the packaging container may first be filled with these particles or chunks up to the desired filling level and when with the gas-containing foam.

No matter whether the packaging container is filled first with foam and then with food product, or conversely first with food product and then with foam, or alternatively is filled with foam and food product simultaneously, it is important according to the present invention that the headspace above the product level in the packaging container be completely filled with foam when the packaging container is sealed by thermosealing, so as to eliminate the risk of air remaining in this headspace.

In such cases where the food product which is to be packed and heat treated in the method according to the present invention consists of or includes a particularly oxygen gas-sensitive food product, such as, for example, sliced, chopped or crushed pineapple, maize, peaches etc. which are affected extremely rapidly by or change appearance already after brief exposure to, air, it is preferred, already before filling into the packaging container, to protect these with a coating of foam which then accompanies the product into the packaging container. Such a protective foam cover may be applied over the sensitive product immediately after washing, peeling and slicing so that the product, without risk of contact with ambient air, may be conveyed on a conveyor belt or the like all the way up to filling into the packaging container.

The choice of foam or frothing agent, respectively, is not critical to the present invention, but may be selected from among a large number of previously known foam and frothing agents in the art. For a person skilled in the art, the choice of suitable frothing agent is thus simple, Preferably however, the present invention calls for the selection of such a foam or such non-oxidising gas, respectively, as has the least imaginable effect on the relevant food product. A non-restrictive example of a usable non-oxidising gas is nitrogen, but also an inert gas, such as argon, may be another example of such an applicable gas.

Further objects, advantages and details of the present invention will be apparent from the following description with reference to the accompanying Drawings.

BRIEF DESCRIPTION OF THE ACCOMPANYING DRAWINGS

Figure 1:
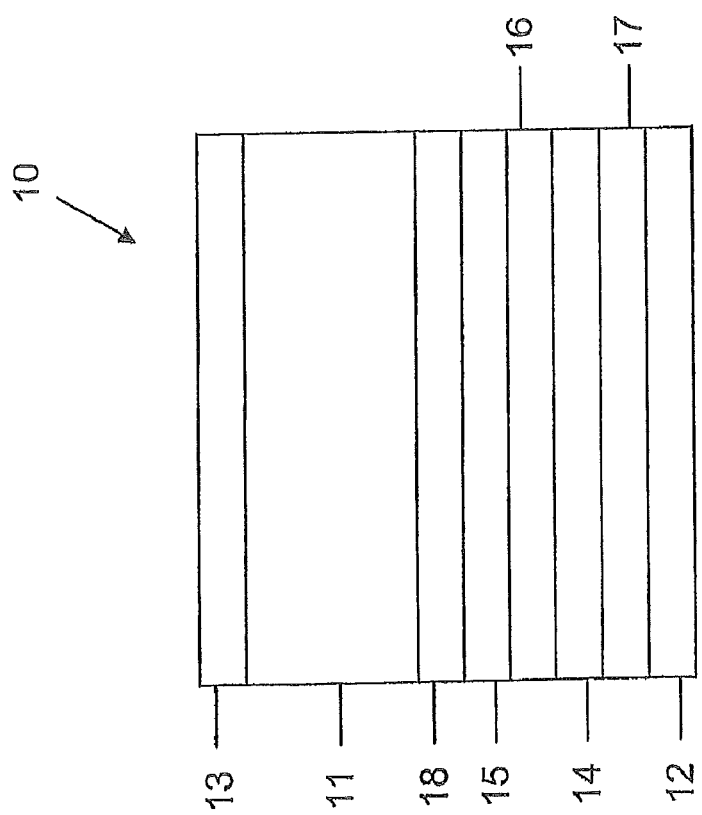
Figure 3:
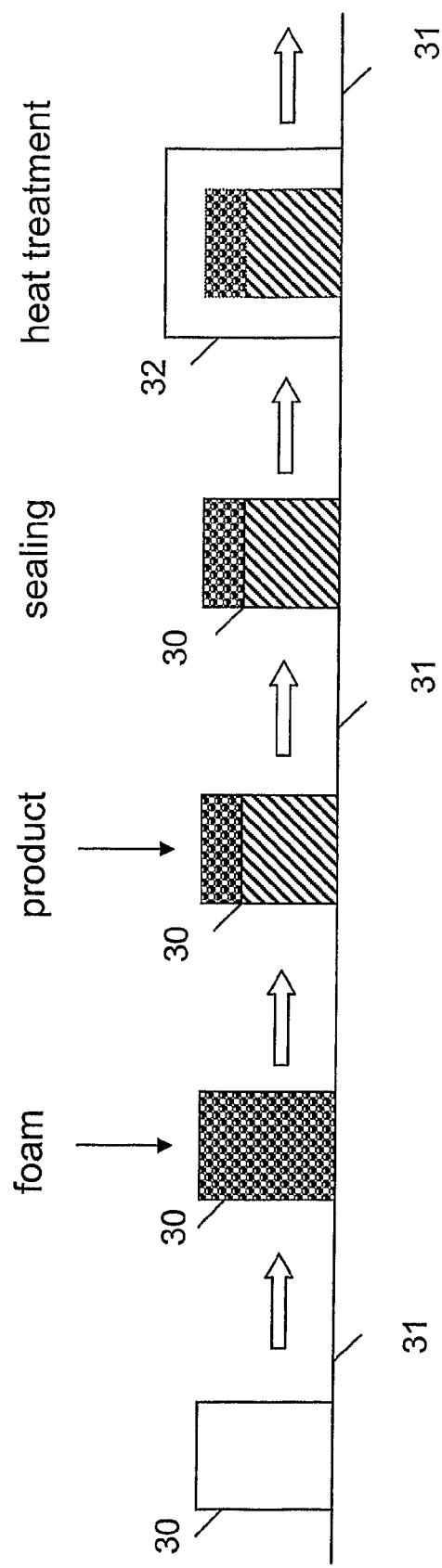
Figure 4:
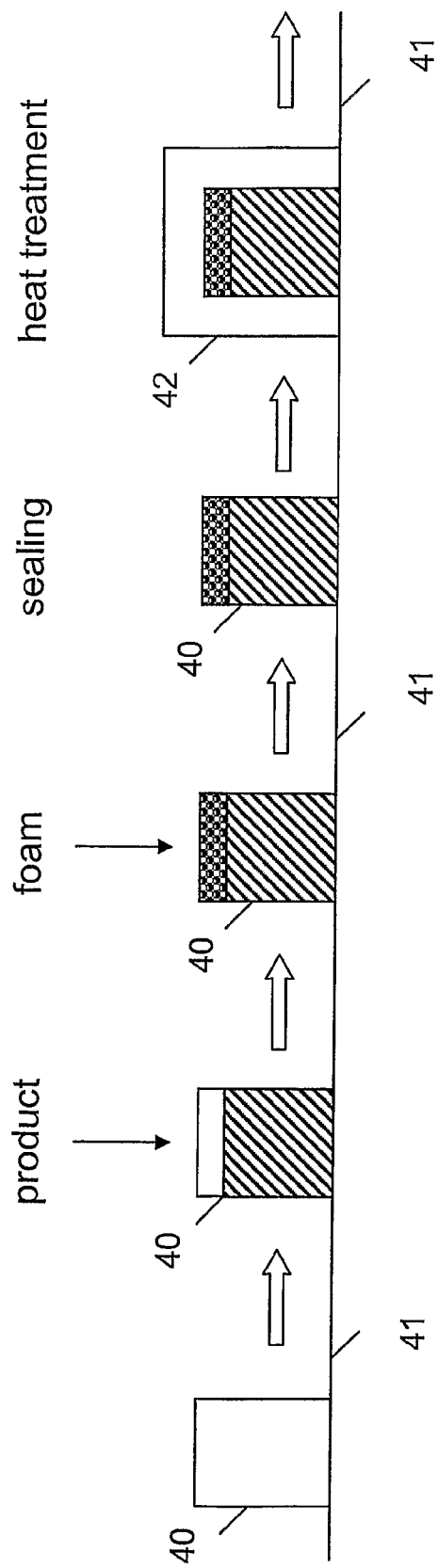

FIG. 1 schematically illustrates a cross section of a prior art paper- or paperboard laminate for a packaging container in the method according to the present invention;

FIG. 2 is a schematic perspective view of a prior art packaging container for use in the method according to the present invention;

FIG. 3 schematically illustrates a first embodiment of the method according to the present invention; and FIG. 4 schematically illustrates a second embodiment of the method according to the present invention.

DETAILED DESCRIPTION OF PREFERRED EMBODIMENT AND ACCOMPANYING DRAWINGS

Although the present invention will hereafter be described with particular reference to the accompanying Drawings, it is not restricted exclusively to these embodiments shown on the Drawings and described hereinbelow. To a person skilled in the art, with the guidance of the foregoing and the following description, it will be obvious that numerous different modifications are possible without departing from the inventive concept as this is defined in the appended Claims.

FIG. 1 schematically shows in cross section a per se known packaging laminate for a packaging container which may be employed in the present invention. The packaging laminate, carrying the generic reference numeral 10, has a layer 11 of paper or paperboard and outer, liquid-tight coatings 12 and 13 of a plastic which is sufficiently heat-resistant to withstand a heat treatment at a temperature of at least 120° C. and which, at the same time, makes for the production of packaging containers by thermosealing. One preferred plastic for both of the outer coatings 12 and 13 is polypropylene (PP). Between the one plastic coating 12 and the paper- or paperboard layer 11, the packaging laminate 10 has a first gas barrier 14 and a second gas barrier 15 which are connected to one another by the intermediary of a layer 16 of an adhesive and to each respective neighbouring layer 12 and 11 by the intermediary of a further layer 17 of an adhesive and a lamination layer 18, respectively, preferably a polypropylene (PP). Such a prior art packaging laminate is described, for example, in WO 2003/035503.

From the packaging laminate 10 in FIG. 1, there may be produced in a per se known manner packaging containers in which a food may be packed and, for purposes of extending its shelf-life, be heat treated following a predetermined time/temperature sequence, e.g. in a retort at a treatment temperature above 115° C., such as, for example, 120-140° C. One typical such packaging container is that which is schematically illustrated and carries generic reference numeral 20 in FIG. 2 and which is produced by fold forming and thermosealing of the packaging laminate. Commercial packaging containers of this type are known under the trademark Tetra Recart®.

FIG. 3 schematically illustrates a first embodiment of the method according to the present invention. An open packaging container 30 of the type which is shown in FIG. 2 is conveyed on a moving conveyor belt 31 in the direction of the illustrated block arrows to a first station. At this station, the packaging container 30, which is intimated by means of the vertical downwardly directed arrow, is filled with a foam containing bubbles or blisters of a frothing material in which a non-oxidising gas is entrapped. The packaging container 30 may, but need not be, filled entirely, as shown, but in certain cases it may be sufficient that the packaging container 30 is only partly filled with foam.

A suitable filling level may be determined from case to case and with particular consideration to the pertinent food product. For certain types of foods, in particular such as include resiliently formable slices or chunks of fruit or vegetables, such as, for example, slices or chunks of pineapple, apple, peach etc., it may, as has already been mentioned, be necessary to fill the entire packaging container 30 with foam, while for other types of foods, for example but slightly resiliently formable particles or chunks of meat, fish, fruit or vegetables, it may be sufficient to fill the packaging container 30 only in part.

The choice of foam and frothing agent, respectively, is not critical to the present invention but may be selected from among a large number of previously known foam and frothing agents in the art. For a person skilled in the art, the choice of suitable frothing agent is thus simple. Preferably however, the present invention calls for the choice of such a foam or such a non-oxidising gas, respectively, as has the least imaginable effect on the pertinent food product. One non-restrictive example of an applicable non-oxidising gas is nitrogen, but also an inert gas, such as argon, may be another example of such an applicable gas.

After the introductory filling with foam, the thus filled packaging container 30 is conveyed further on the moving conveyor belt 31 in the direction of the illustrated block arrow to a second station. At this station, the packaging container 30 is filled with the pertinent food product to the desired level. As is intimated in FIG. 3, and has previously been explained, the packaging container 30 is not completely filled with this product, but only up to a level below the upper open edge of the packaging container during simultaneous forcing-out of a corresponding quantity of foam. The space above the selected product level in the packaging container 30, the headspace, should, after this product filling, preferably be completely filled with foam in order to ensure that no air remains in the filled packaging container.

After the product filling operation, the packaging container 30 filled with foam and product is conveyed further on the moving conveyor belt 31 in the direction of the illustrated block arrow to a third station where the filled packaging container 30 is closed by thermosealing. If the headspace above the product level inside the packaging container 30 is, for some reason, not completely filled with foam when the packaging container 30 arrives at the third station, it may be appropriate or necessary to fill the packaging container 30 with additional foam in order to ensure that this space is completely filled with foam when the packaging container 30 is sealed. Such replenishment with foam may, for example, be necessitated by the fact that foam which had been filled into the container at the second station has had time to implode and collapse during the transport up to the third station, or that foam has spilt out over the open upper edges of the packaging container 30 because of an excessively jerky transport on the conveyor belt 31.

After closure by thermosealing at the third station, the sealed packaging container 30 filled with product and foam is conveyed further in the direction of the illustrated block arrow to a subsequent station (heat treatment) for a heat treatment of the packed product in order to extend its shelf-life at a treatment temperature of at least approx. 115° C. The heat treatment to extend product shelf-life is preferably carried out in a manner well-known to a person skilled in the art in a retort 32 at a treatment temperature of approx. 120-140° C.

FIG. 4 schematically illustrates a second embodiment of the method according to the present invention. An open packaging container 40 of the type which is illustrated in FIG. 2 is conveyed on a moving conveyor belt 41 in the direction of the illustrated block arrows to a first station. At this station, the packaging container 40 is filled, as intimated by means of the vertical downwardly directed arrow, with the pertinent food product up to the desired level. For previously mentioned reasons, it is not desirable that the packaging container 40 be filled entirely, but only partly up to a product level which is below the upper edges of the open packaging container.

After the introductory product filling, the partly filled packaging container 40 is conveyed further in the direction of the illustrated block arrow to a second station (foam) where the unfilled headspace above the product level is filled entirely with a foam during simultaneous forcing-out of air present in this headspace.

As in the first embodiment, the foam includes bubbles or blisters or a frothing material in which a non-oxidising gas is entrapped. The choice of foam or frothing material, respectively, is not critical to the present invention, but may be selected from among a large number of previously known foam and frothing agents in the art. For a person skilled in the art, the choice of suitable frothing agent is thus simple. Preferably however, the present invention calls for the choice of such a foam and such a non-oxidising gas, respectively, as have the least imaginable effect on the pertinent food product. One preferred example of a non-oxidising gas is nitrogen, but an inert gas, such as argon, may also be employed in the method according to the present invention.

From the second station, the packaging container 40 filled with product and foam is conveyed further on the moving conveyor belt 41 in the direction of the illustrated block arrow to a third station for sealing by thermosealing. If the headspace above the product level in the packaging container 40 were, for some reason, not to be entirely filled with foam when the packaging container 40 arrives at the third station, it may be appropriate or necessary to fill the packaging container 40 with additional foam in order to ensure that this space is completely filled with foam when the packaging container 40 is sealed. Such replenishment with foam may, for example, be caused by the fact that foam which had been filled at the third station has already had time to implode and collapse during the transport up to the third station, or that foam has spilt out over the open upper edges of the packaging container 40 because of an excessively jerky transport on the conveyor belt 41.

After closure by thermosealing at the third station, the sealed packaging container 40 filled with product and foam is conveyed further in the direction of the illustrated block arrow to a subsequent station for a heat treatment of the packed product with a view to extending its shelf-life, at a treatment temperature of at least approx. 115° C. The heat treatment for extending the shelf-life of the product is preferably carried out in a manner well-known to a person skilled in the art in a retort 42 at a treatment temperature of approx. 120-140° C.

In such cases where the food product which is to be packed and heat treated in the method according to the present invention consists of or includes a particularly oxygen gas-sensitive food product, such as, for example, sliced, chopped or crushed pineapple, maize, peaches etc. which change colour extremely rapidly and alter appearance already after a brief exposure to air, it is preferred, already before filling into the packaging container, to protect the sensitive food product against contact with ambient air. Preferably, the product is therefore covered with a cover of foam which is applied on the sensitive product immediately after washing, peeling and slicing, so that the product may be transported on a conveyor belt or the like all the way up to filling into the packaging container without risking coming into contact with air.

Although the present invention has been described in detail with reference to the embodiments specifically illustrated on the Drawings, it is not restricted exclusively to these embodiments and details. To a person skilled in the art, it will be obvious that numerous different modifications and alterations are possible without departing from the scope of the inventive concept as this is defined in the appended Claims.

INDUSTRIAL APPLICATION

The method according to the invention is particularly applicable in the packing of a food in a packaging container in which the food is, for purposes of extending its shelf-life, to be heat treated at a treatment temperature of at least 115° C., such as in a retort in which the food is subjected to such a heat treatment at approx. 120-140° C. The method according to the invention affords the surprising advantage that the foam, after such a heat treatment and subsequent storage of the food product in the unopened packaging container has practically completely disappeared and is no longer visible when the packaging container is opened.

What is claimed is:

1. A method of packing and heat treating a solid or semi-solid food product in a packaging container of paper or paperboard, the method comprising, prior to filling of the solid or semi-solid food product, filling the packaging container with a foam containing a non-oxidising gas and, after the filling, sealing the packaging container by thermosealing and subjecting the packed solid or semi-solid food product to a heat treatment for purposes of extending the shelf-life of the packed solid or semi-solid food product in the sealed packaging container, wherein the heat treatment is carried out at a treatment temperature of at least 115° C., and wherein the solid or semi-solid food product comprises resiliently formable slices or chunks of fruit or vegetables.

2. The method as claimed in claim 1, wherein the heat treatment is carried out in a retort at a treatment temperature of 120-140° C.

3. The method as claimed in claim 1, wherein the packaging container, after filling with the solid or semi-solid food product, is filled with additional foam in order to entirely fill the headspace above the product level with foam.

4. The method as claimed in claim 1, wherein the packaging container is filled entirely with said foam prior to filling with the solid or semi-solid food product.

5. The method as claimed in claim 1, wherein the headspace above the product level in the packaging container is kept completely filled with foam during sealing of the packaging container by thermosealing.

6. The method as claimed in claim 1, wherein at least a particularly oxygen gas-sensitive portion of the solid or semi-solid food product is covered with said foam before being filled into the packaging container.

7. A method of packing and heat treating a solid or semi-solid food product comprising resiliently formable slices or chunks of fruit or vegetables in a packaging container of paper or paperboard, the method comprising:
   moving the packaging container by way of a conveyor on which the packaging container is positioned, the packaging container comprising an open upper end;
   introducing foam containing a non-oxidising gas, followed by the solid or semi-solid food product, into the packaging container by way of the open upper end so that headspace above the solid or semi-solid food product is completely filled with the foam;
   thermosealing the packaging container in which the headspace above the solid or semi-solid food product is completely filled with the foam to produce a packaged solid or semi-solid food product in a sealed packaging container;
   moving the sealed packaging container to a heat treatment station; and
   heat treating the packed solid or semi-solid food product at a treatment temperature of at least 115° C. to extend a shelf-life of the solid or semi-solid food product in the sealed packaging container.

8. The method as claimed in claim 7, wherein the heat treating comprises heat treating the packed solid or semi-solid food product in a retort at a temperature of 120° C.-140° C.

9. The method as claimed in claim 7, wherein the introducing of the solid or semi-solid food product and the foam into the packaging container comprises introducing the foam containing the non-oxidising gas into the packaging container at a first station, moving the packaging container by way of the conveyor to a second station, and introducing the solid or semi-solid food product into the packaging container located at the second station to force-out at least some of the foam from the packaging container.

10. The method as claimed in claim 9, further comprising introducing additional foam into the packaging container at a third station after introducing the solid or semi-solid food product into the packaging container to entirely fill the headspace above the product with foam.

11. The method as claimed in claim 7, wherein the introducing of the solid or semi-solid food product and the foam into the packaging container comprises introducing the foam containing the non-oxidising gas into the packaging container so that the packaging container is completely filled with the foam, and introducing the solid or semi-solid food product into the packaging container to force-out some of the foam from the packaging container.

12. The method as claimed in claim 7, wherein the introducing of the solid or semi-solid food product and the foam into the packaging container comprises introducing the foam containing the non-oxidising gas into the packaging container so that the packaging container is less than completely filled with the foam, and introducing the solid or semi-solid food product into the packaging container to force-out some of the foam from the packaging container.

13. The method as claimed in claim 7, covering at least a part of the solid or semi-solid food product with the foam before introducing the solid or semi-solid food product into the packaging container.

* * * * *